United States Patent [19]
Ellis

[11] 3,865,340
[45] Feb. 11, 1975

[54] SUPPORT APPARATUS
[75] Inventor: Stafford Malcolm Ellis, Maidstone, England
[73] Assignee: Elliott Brothers (London) Limited, Essex, England
[22] Filed: Oct. 2, 1973
[21] Appl. No.: 402,743

[30] Foreign Application Priority Data
Oct. 4, 1972 Great Britain............... 45737/72

[52] U.S. Cl................. 248/399, 248/350, 248/421
[51] Int. Cl............................................. F16m 13/00
[58] Field of Search....... 248/15, 20, 350, 182, 370, 248/184, 399, 419, 421; 244/1 SA; 74/5.34; 297/344, 345, 307, 309

[56] References Cited
UNITED STATES PATENTS
2,277,875  3/1942  Macbeth............................ 248/350
3,102,721  9/1963  Linville........................... 248/350 X
3,703,999  11/1972  Forys et al......................... 248/20

Primary Examiner—Casmir A. Nunberg
Attorney, Agent, or Firm—Kirschstein, Kirschstein, Ottinger & Frank

[57] ABSTRACT

Apparatus is provided, particularly for a gyroscope mounting, for supporting a first body on a second body so that relative movement between the two bodies is permitted in three mutually perpendicular directions only, i.e., relative rotary movement is prevented. Damping means may be connected between the bodies to provide a shock and vibration isolating arrangement.

7 Claims, 3 Drawing Figures

SUPPORT APPARATUS

This invention relates to apparatus for supporting a first body on a second body so that relative movement between the two bodies is permitted in three mutually perpendicular directions only, i.e., relative rotary movement is prevented.

According to the invention an apparatus for supporting a first body on a second body so that relative movement between the two bodies is permitted in three mutually perpendicular directions only comprises a first parallel motion linkage comprising a pair of parallel members connected at one end with the first body so as to be pivotable about respective spaced apart axes, a second parallel motion linkage comprising a pair of parallel members connected at one end with the second body so as to be pivotable about respective spaced apart axes, all said axes being parallel to one another, and a third parallel motion linkage comprising a pair of parallel members connected with the other ends of all the members of the first and second parallel motion linkages so that at each connection between a member of said third linkage and a member of said first or second linkage, relative pivotal movement is possible about one axis parallel to said first and second linkage axes and about another axis perpendicular to said one axis and parallel to planes containing said first linkage axes and said second linkage axes respectively.

Apparatus in accordance with the invention finds application wherever it is required to permit motion between two bodies about three mutually perpendicular axes whilst preventing relative rotary motion between the two bodies, for example in the fields of optical measurement and machine tools.

One particular application of the apparatus in accordance with the invention is an arrangement for isolating a body from shocks and vibration applied to a second body whilst maintaining the two bodies in a stable angular position relative to one another.

According to a preferred feature of the invention, damping means are connected between the bodies to provide a shock and vibration isolating arrangement.

According to a further preferred feature of the invention, the first and second parallel motion linkages comprise plate members, two of said plate members each having an aperture and the other two of said plate members each passing through one of the apertures so that the plate members are arranged in two X-configurations.

The invention will be more readily understood from the following description of a preferred embodiment taken in conjunction with accompanying drawings in which.

Figure 1:
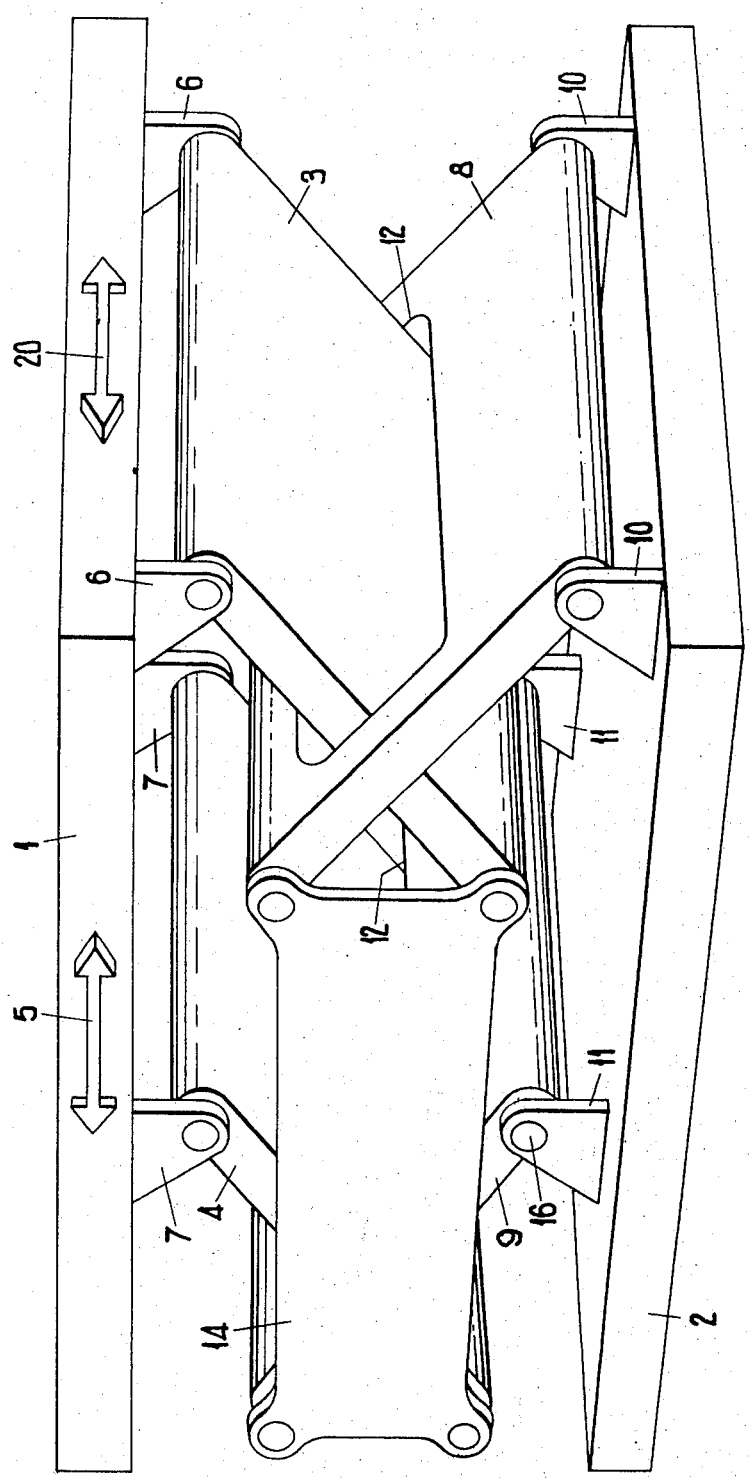
FIG. 1 is a perspective view of a support apparatus.

Referring to the drawings, the first body is in the form of a rectangular top platform 1 and the second body is in the form of a rectangular base platform 2, corresponding faces of the platforms being parallel to one another. A first parallel motion linkage is formed by a pair of equal length plate members 3, 4 which are mounted in lugs, 6, 7 adjacent the longer edges of the platform 1, so as to be pivotable about a pair of axes lying parallel to the shorter edges of the platform 1. A second parallel motion linkage is formed by a pair of equal length plate members 8, 9 which are mounted in lugs 10, 11 adjacent the longer edges of the platform 2 so as to be pivotable about a pair of axes lying parallel to the shorter edges of the platform 2. The four axes are thus all parallel to one another. The plate members 8, 9 are each provided with an aperture 12 through which the plate members 3, 4 pass so that the members 3 and 8 and 4 and 9 form X-configurations. A third parallel motion linkage is formed by a pair of substantially rectangular plate members 14, 15 which are connected at one end to the members 3 and 8 and at the other end to the members 4 and 9 so as to be parallel to and between the longer edges of the platforms 1 and 2.

The connections between the members 14, 15 and the members 3, 4, 8 and 9 must be formed by bearings capable of allowing pivotal movement between the connected parts about two perpendicular axes, for example spherical bearings 16. Whilst for convenience, the connections between the members 3, 4, 8 and 9 and the lugs 6, 7, 10 and 11 may also be formed by such bearings, they need be capable of allowing pivotal movement about one axis only.

Figure 2:
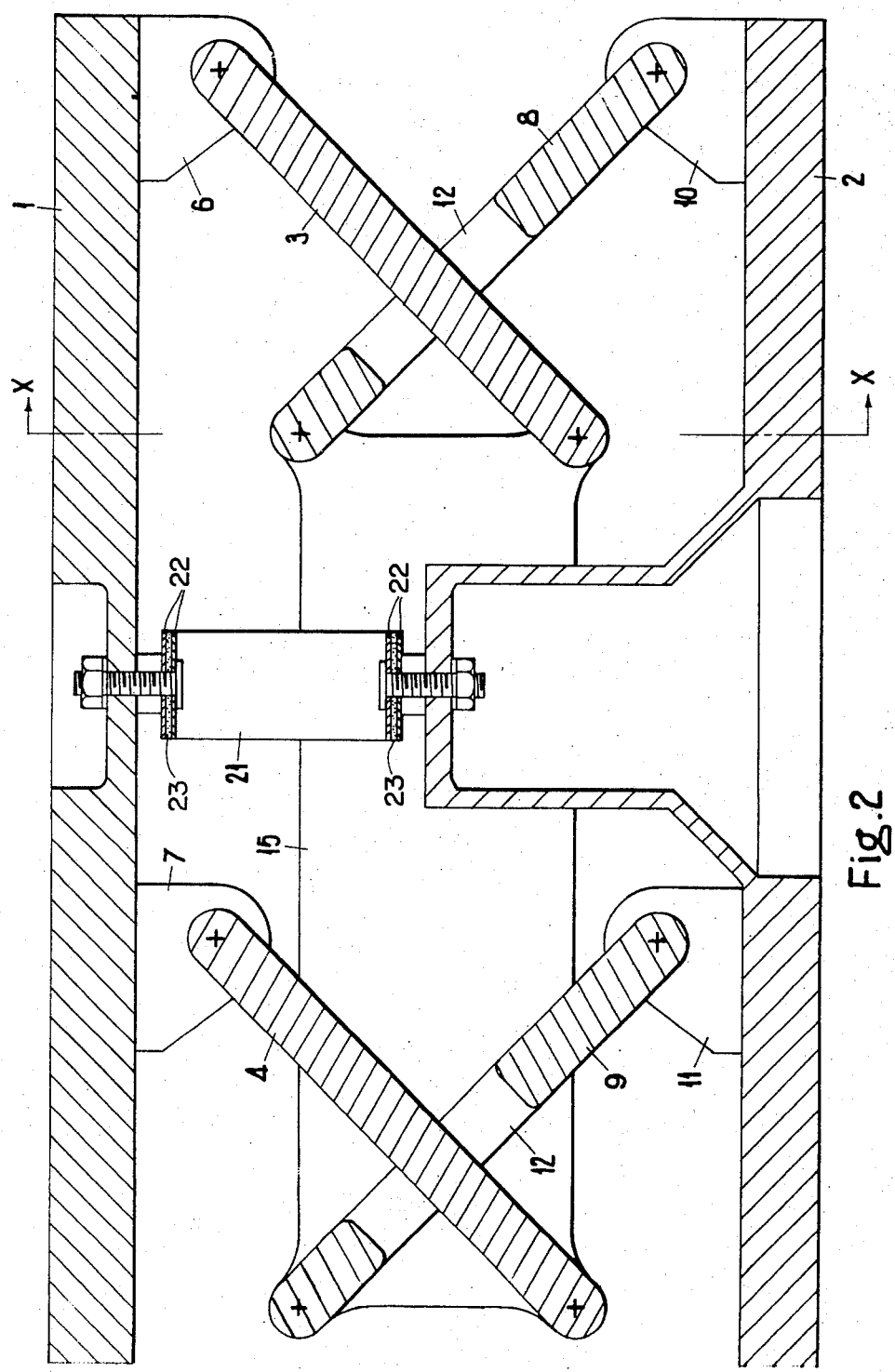
FIG. 2 is a sectional view on line Y—Y of FIGS. 3.
Figure 3:
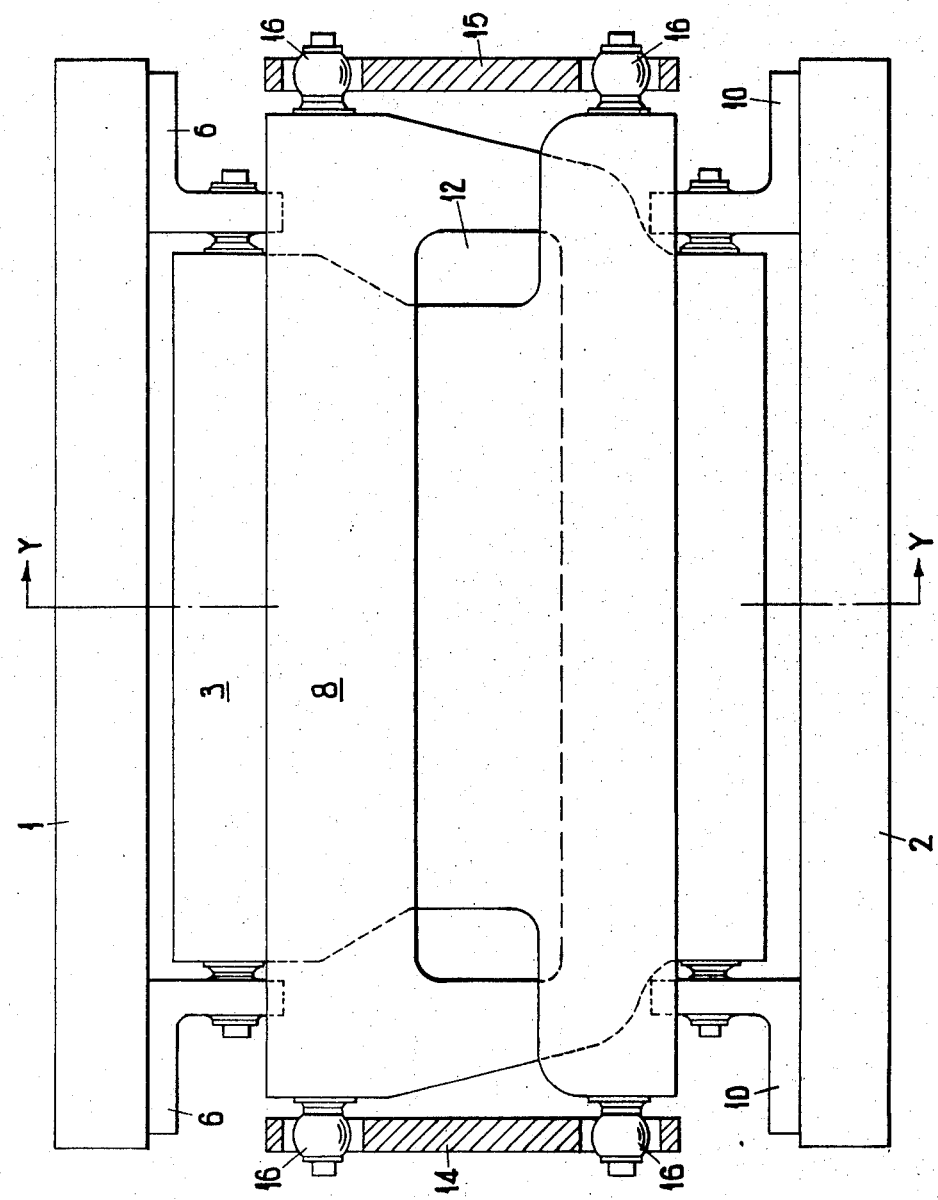
FIG. 3 is a sectional view along line X—X of FIG. 2.

Assuming that the base platform 2 is fixed, vertical movement and horizontal movement in the direction of the arrow 5 (FIG. 1) of the top platform 1 is permitted by the members 3, 4 pivoting in parallel along with members 8, 9 as is best seen with reference to FIG. 2. Horizontal movement in the direction of the arrow 20 (FIG. 1) is permitted by the members 14, 15 tilting in parallel on the spherical bearings 16 as is best seen by reference to FIG. 3. The apertures 12 are sufficiently large to allow the required range of movement.

Rotational movement of the top platform about any of the three axes can occur only if sufficient force is applied to distort the members 3, 4, 8 and 9. Thus rotational movement can be prevented by making the members 3, 4, 8 and 9 of sufficient rigidity to withstand any forces likely to be applied.

Three axis translational movement is thus afforded to the top platform by only six moving parts while constraint is applied which ensures that there is no angular movement of the top platform relative to the base platform about the three axes.

Since the suspension described above permits only relative linear movement between two bodies whilst preventing relative rotary movement, it is suitable for use in an arrangement for isolating the top platform from shocks and vibrations imparted to the base platform. In this case, damping means 21 (shown only in FIG. 2 for convenience) are connected between the platforms 1 and 2. As shown in FIG. 2, a suitable form of damping means consists of a so called X-mounting which consists of a two layer spring steel hoop comprising two spring steel layers 22 having damping material 23 sandwiched between the them. The hoop can be distorted linearly in all three axes.

Shocks imparted to the base platform 2 in the directions of the vertical and two horizontal axes mentioned above are isolated from the top platform 1 by the members 3, 4, 8, 9, 14 and 15 pivoting in the same manner as mentioned previously against the resistance of the damping means 21.

A particular feature of the suspension is that the damping means does not have to be centrally located as shown in FIG. 2. The parallel motion linkages provide anti-rotational constraint so motion resistive forces i.e., spring force, can be displaced from the centre line axis of the platforms without introducing angular errors. This allows additional damping to be introduced around the edge of the platforms if so required for a particular application.

Because of the tolerance of the suspension to non-central forces it is also unimportant that the damping means be iso-elastic, i.e., have equivalent stiffness in all three axes. Indeed, it may be desireable, dependent on the application of the suspension, that the damping means is deliberately designed so that the stiffness varies from axis to axis.

Another feature of the suspension is that the members 14, 15 only carry tensile/compressive loadings between their bearings and thus can be comparatively small in cross-section and light in weight. This is advantageous as the members 14, 15 move lengthways during vertical movement of the platform 1 or in the presence of vertical shocks on the platform 2. The lower the mass of the members 14, 15 therefore, the less force is required to move them and the better the suspension operates.

The suspension with damping is particularly suitable for an angularly stable base for a gyro platform with particular application to a naval environment where large linear displacements can result under shock conditions.

I claim:

1. An apparatus for supporting a first body on a second body so that relative movement between the two bodies is permitted in three mutually perpendicular directions only, comprising
   I. a first parallel motion linkage comprising
      A. at least two substantially rigid parallel members each connected at one end with the first body so as to be pivotable about respective spaced apart axes,
   II. a second parallel motion linkage comprising
      A. at least two substantially rigid parallel members each connected at one end with the second body so as to be pivotable about respective spaced apart axes,
   III. all said axes being parallel to one another, and
   IV. a third parallel motion linkage comprising
      A. a pair of substantially rigid parallel members each connected with the other ends of all the members of the first and second parallel motion linkages so that at each connection between a member of said third linkage and a member of said first or second linkage, relative pivotal movement is possible
         i. about one axis parallel to said first and second linkage axes and
         ii. about another axis perpendicular to said one axis and parallel to planes containing said first linkage axes and said second linkage axes respectively.

2. An apparatus according to claim 1, in which the first and second parallel motion linkages comprise plate members, half the number of said plate members each having an aperture and the other half the number of said plate members each passing through one of the apertures so that the plate members are arranged in X-configurations.

3. An apparatus according to claim 2, in which the third parallel motion linkage comprises plate members of substantially less mass and thickness than the members of the first and second linkages.

4. An apparatus according to claim 1, in which the connections between the third parallel motion linkage and the first and second parallel motion linkages are formed by bearings capable of allowing movement about two perpendicular axes and the connections between the first and second parallel linkages and the first and second bodies are formed by bearings capable of allowing movement about at least one axis.

5. An apparatus according to claim 4, in which all the connections are formed by spherical bearings.

6. An apparatus according to claim 1, in which damping means are connected between the two bodies to provide a shock and vibration isolating arrangement.

7. An apparatus according to claim 6, in which the damping means comprises a two layer spring steel hoop having damping material sandwiched between the layers.

* * * * *